(12) United States Patent
Terán-Matus et al.

(10) Patent No.: US 8,068,929 B2
(45) Date of Patent: Nov. 29, 2011

(54) SYSTEM FOR DESIGNING AND PRODUCING CUSTOM LAYOUTS FOR STORAGE OR TRANSPORTING MOLDS

(75) Inventors: José-Adalberto Terán-Matus, Monterrey (MX); Rolando-Rafael Hernández-Cisneros, Hidalgo (MX); Eduardo Ruiz-Esparza-Flores, San Pedro Garza García (MX)

(73) Assignee: RFID Mexico, S.A. DE C.V., Nuevo Leon (MX)

( * ) Notice: Subject to any disclaimer, the term of this patent is extended or adjusted under 35 U.S.C. 154(b) by 419 days.

(21) Appl. No.: 12/416,443

(22) Filed: Apr. 1, 2009

(65) Prior Publication Data

US 2010/0256790 A1 Oct. 7, 2010

(51) Int. Cl.
*G06F 19/00* (2011.01)
*G05D 3/00* (2006.01)
(52) U.S. Cl. ............. 700/117; 700/95; 700/97; 700/98; 700/118; 700/303

(58) Field of Classification Search .................... 700/95, 700/97, 98, 117, 118, 303
See application file for complete search history.

(56) References Cited

U.S. PATENT DOCUMENTS

| | | | |
|---|---|---|---|
| 7,742,831 B2 * | 6/2010 | Weill et al. ...................... 700/86 |
| 7,895,009 B2 * | 2/2011 | Sundman et al. ............. 702/104 |
| 7,937,173 B2 * | 5/2011 | Weill et al. ...................... 700/86 |
| 2006/0209062 A1 | 9/2006 | Drucker et al. |
| 2010/0030354 A1 * | 2/2010 | Wiesel ............................ 700/97 |
| 2010/0234982 A1 * | 9/2010 | Sankaran et al. ............. 700/216 |
| 2010/0260999 A1 * | 10/2010 | Filip ........................... 428/304.4 |

* cited by examiner

*Primary Examiner* — Ronald Hartman, Jr.
(74) *Attorney, Agent, or Firm* — Young & Thompson

(57) ABSTRACT

An automated system for producing custom layouts for storage or transport molds made of foam or any other malleable material used for storage or package items, which is capable of identifying the type of item depicted by each image file, automatically generating the shape of each receptacle; automatically distributing the identified items in one or more molds; and automatically generating the accommodation layout of each receptacle in the one or more molds.

20 Claims, 3 Drawing Sheets

SYSTEM FOR DESIGNING AND PRODUCING CUSTOM LAYOUTS FOR STORAGE OR TRANSPORTING MOLDS

BACKGROUND OF THE INVENTION

A. Field of the Invention

The present invention is related to methods and systems for designing and producing custom foams either for storage or transporting items having a plurality of receptacles for storing an item, and more particularly to a system for designing and producing storage or transport molds of the above referred nature, which selects the optimum layout for the receptacles of the foam and also selects the best position to place an identification tag as well as the reader if required, by means of artificial intelligence techniques such like neural networks and evolutionary algorithms.

B. Description of the Related Art

There are well known packaging or storage foams having a plurality of receptacles for storing items such as tools like in toolboxes in the workshops, jewelry, etc. The normal process for designing such packaging or storage foams is complicated and expensive in view of the work needed to produce each receptacle which needs to conform precisely to the shape of the item to be stored. This happens specially when the configuration for the foam is different every time like in the toolboxes at the workshops as every toolbox has a different set of tools with different brands and models depending on the type of job to perform and the users preferences. While in many industries the manufacture custom products that are different pretty often and the shape of the product to package or storage is different very often and it gets worse when multiple pieces need to be placed in the same foam or set of foams.

Said design process involves measuring or scanning each item so that the engineering team can design the packaging or storage foam and create the shape of each receptacle to be formed in said foam and distribute the layout of each receptacle using known design computer programs—which only aid to create shapes and forms. The complexity of the design process increases when the items to be stored are different from each other.

The complexity of the design process increases even more when there is a need to add identification means to each item such as RFID chips, since it is needed to analyze the form and function of each object in order to integrate the chip in the optimum place in the object so that said chip does not interfere with the item functions. Once the optimum places for integrating the chip have been determined for each item, it is needed to identify the optimum places in which the identification means reading means, such as RFID readers, should be placed in each receptacle—if required—in such a way that the reading capacity of each RFID reader is optimized in the correspondent range. The above design process needs to be carried out by qualified personal and is very expensive, takes a lot of time and is not very precise, especially when the packaging foam needs to be designed for storing many items.

US patent application No. 20060209062 of Drucker discloses a system for positioning objects in a container comprising: a module that receives parameters associated with placing an object in a container and calculates a location for the object in the container along a one-manifold embedded within the container. A one-manifold may be continuous, discontinuous, be contained entirely within a container or extent beyond a container. The one-manifold may be defined by a set of parameters defining a function, formula or set of points. The container may be a two-dimensional, three-dimensional, or n-dimensional container. Such a mechanism may be employed by a graphics application and may determine the location or positioning of an object or item. The object or item may be one of a set of objects or items. In response to receiving a set of parameters defining a one-manifold, the one-manifold may be embedded within a container. In response to receiving a set of parameters describing aspects of the object or item to be placed within the container, a set of x and y or x, y and z co-ordinates may be generated, which may be sent to a standard graphics interface for display.

Although Drucker's patent application discloses a system which is capable of distributing objects inside a container, it does not disclose the capability of designing packaging foams and creating the shape of a plurality of receptacles to be formed in said foam and distributing each receptacle in an optimum way. Furthermore, if there is needed to integrate identifications means to each item and identification means readers to each receptacle for reading said identifications means in each item, Drucker's patent application neither disclose the capability of finding the optimum places for integrating the chip in each item nor the capability of finding the optimum places in which the identification means reading means, such as RFID readers, should be placed in each receptacle.

In view of the above referred problems, applicant developed an automated system for producing custom layouts for storage or transport molds made of foam or any other malleable material used for storage or package items, which is capable of designing custom packaging made of foam (pads) or any other malleable material having a plurality of receptacles for storing a plurality of items.

Applicant's system is capable of determining if all items can be stored in a single pad or if another pad will be needed, finding the optimum distribution of each receptacle to be formed in each pad, finding the optimum places for integrating the chip in each item, and finding the optimum places in which the identification means reading means, such as RFID readers, should be placed in each receptacle by using artificial intelligence paradigms called neural networks and genetic algorithms.

The final product of Applicant's system is an electronic file containing the complete design of one or more custom packaging including the layout of each receptacle having the shape of each particular item that will define the cuts in the custom packaging and which can be provided to any computer controlled molding machine, and the optimum places where the identification means should be integrated in the items and the optimum places where the identification means readers should be placed in each receptacle—if required—.

SUMMARY OF THE INVENTION

It is therefore a main object of the present invention to provide a system and method for producing custom layouts for storage or transport molds made of foam or any other malleable material used for storage or package items, which is capable of designing custom packaging made of foam (pads) or any other malleable material having a plurality of receptacles for storing a plurality of items.

It is another main object of the present invention to provide a system and method for producing custom layouts for storage or transport molds of the above referred nature which is capable of distributing the needed tools among one or more available pads, finding the optimum distribution of each receptacle to be formed in each pad, finding the optimum places for integrating the chip in each item, and finding the optimum places in which the identification means reading means, such as RFID readers, should be placed in each receptacle by using artificial intelligence paradigms called neural networks and genetic algorithms.

It is a further object of the present invention to provide a system and method for producing custom layouts for storage or transport molds of the above referred nature which provides an electronic file containing the complete design of one or more custom packaging including the layout of each receptacle having the shape of each particular item that will define the cuts in the custom packaging and which can be provided to any computer controlled molding machine.

It is an additional object of the present invention to provide a system and method for producing custom layouts for storage or transport molds of the above referred nature which provides the optimum places where the identification means should be integrated in the items and the optimum places where the identification means readers should be placed in each receptacle—if required—.

These and other objects and advantages of the system for designing and producing storage or transport molds of the present invention will become apparent to those persons having an ordinary skill in the art, from the following detailed description of the embodiments of the invention which will be made with reference to the accompanying drawings.

DETAILED DESCRIPTION OF THE INVENTION

Figure 1:
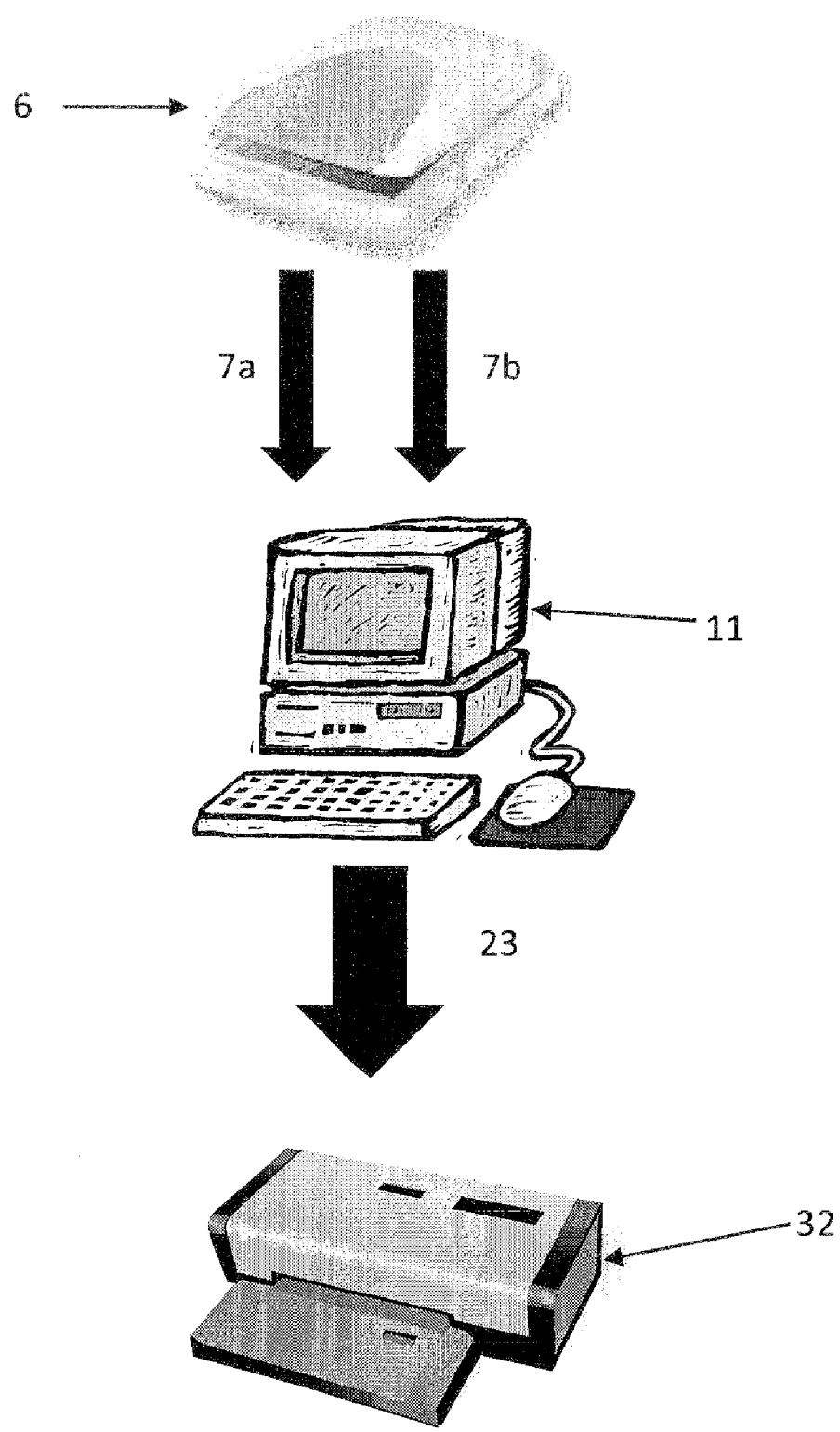
FIG. 1 is a schematic view of the components of the system for designing and producing custom layouts for storage or transport molds in accordance with the present invention.
Figure 2:
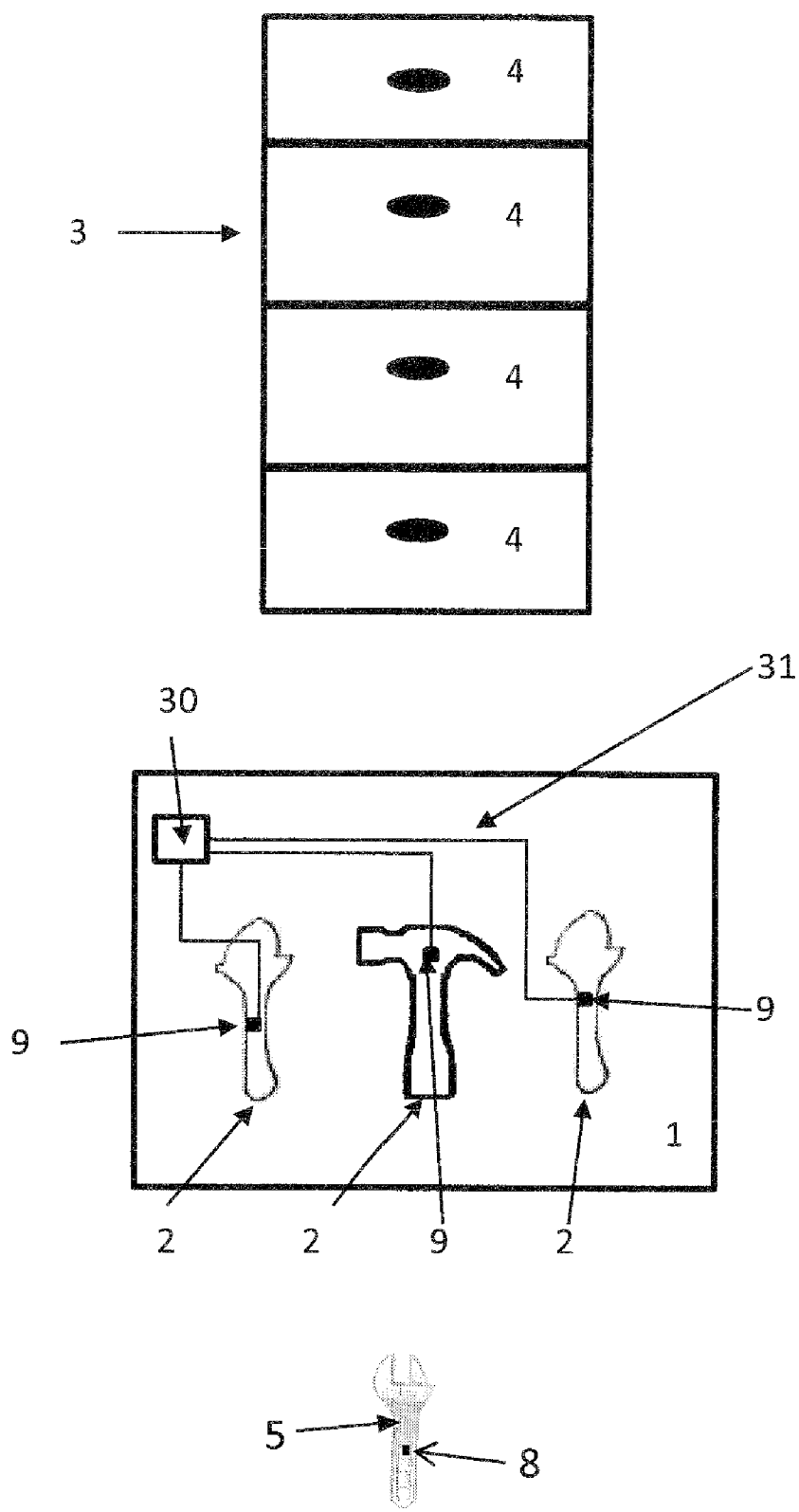
FIG. 2 is a schematic view of a pad including a plurality of receptacles created by the system of the present invention for storing a plurality of tools having different sizes, shapes and weights to be stored inside a cabinet having a predetermined number of drawers.
Figure 3:
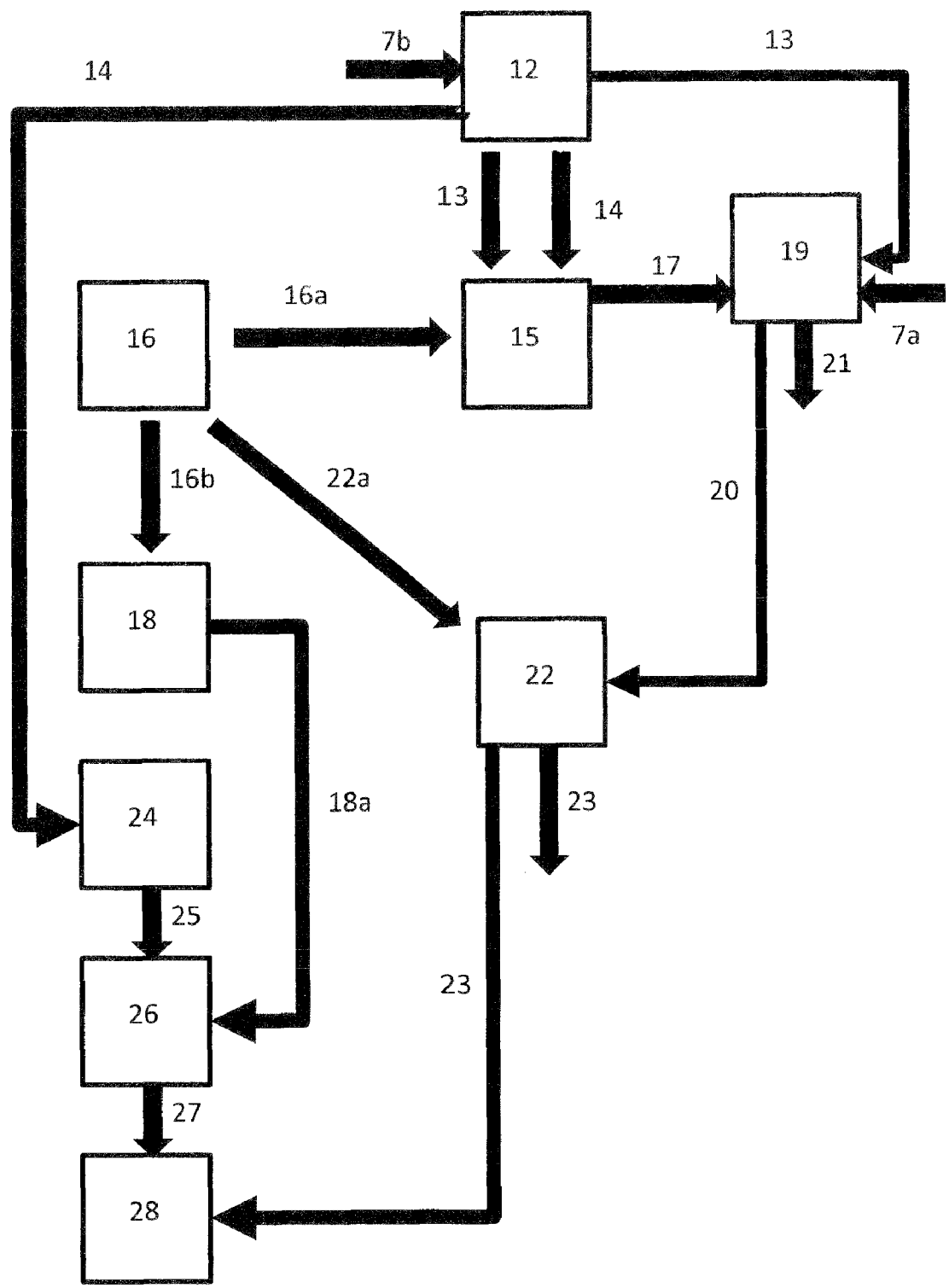
FIG. 3 is a scheme of a hub in accordance with the present invention.

The system for producing custom layouts for storage or transport molds of the present invention will be described making reference to the accompanying drawings and to a preferred embodiment.

In a preferred embodiment, the system for producing custom layouts for storage or transport molds of the present invention will be applied for producing a predetermined number of foam pads 1 including a plurality of different shaped receptacles 2 for storing a plurality of tools 5 having different sizes, shapes and weights. Each pad 1 to be stored inside a cabinet 3 having a predetermined number of drawers 4 for storing a pad 1, wherein the system for producing custom layouts for storage or transport molds of the present invention comprises:

means for producing 2D or 3D electronic image files of each tool which requires to be stored in one or more pads comprising any known image scanner 6. Said 2D electronic image files 7a comprising files in a format such as BMP or PNG, and said 3D image file 7b comprising a vectorial DXF file;

means for identifying the type of tool 5 depicted by each image file 7a, 7b, for distributing tools 5 in one or more pads 1, for generating the distribution layout of each receptacle 2 corresponding to each tool 5 inside the space of each available pad 1, for determining the optimum place for attaching an RFID identification chip 8 to each tool 5 and for defining the optimum place for attaching corresponding RFID readers 9 to a correspondent receptacle 2 and generating one or more image files 23 each containing the distribution layout of each receptacle 2 in a correspondent pad 1 having the shape of each tool 5 of each pad 1, each suitable to be send to a molding machine, said means comprising a computer 11 running the following programs;

a 3D to 2D exporting program 12 for processing each original 3d files 7b—pertaining to each scanned tool—, and producing a file including only a delimited image of the tool, called a "minimum container box file", for which a centroid and a tridimensional coordinated axis originating in said centroid is calculated for finally producing said 2D minimum container image file 13 by "cutting" the 3D image of the minimum container box file using said centroid and tridimensional coordinated axis and three pairs of 2D opposite view image files 14 each containing opposite views taken from each side of the minimum container box file 13;

a tool identification neural network 15 for processing each 2D minimum container image file 13—pertaining to each scanned tool—, and identifying the type of tool depicted by each image file, which generates a plurality of patterns based on said 3D or 2D tool image files and accesses a network memory 16 containing information related to a plurality of previously identified tools 16a in order to use said information 16a and the plurality of patterns and identify the type of tool—i.e. identify if the tool is a hammer, screwdriver, etc. and particular types of those families—. The output of the tool identification neural network comprises a text file 17 including the identification information of each tool such as tool type, tool family, tool class, etc. A complementary "working areas" identification neural network 18 identifies the "working areas" of each identified tool which are the areas or places where the tool performs its function and/or is manipulated by the user and that must not be considered for placing the RFID identification chip 8, wherein the identification of said "working areas" is carried out based on previously defined rules and identification examples for each tool family and class stored 16b in a network memory 16, said "working areas" identification neural network 18 producing a "working areas" file 18a indicating the "working areas" for each tool;

a distributing genetic algorithm 19 for distributing tools 5 in one or more pads 1, each to be stored in a correspondent drawer 4 of a cabinet 3 which receives as input: the text file 17 including the identification information of each tool, the plurality of 2D image files 7a—in a BMP or PNG format for example—obtained by the scanner or the plurality of 2D minimum container box image files 13—in a BMP or PNG format for example—obtained from the original 3D image files 7b by the 3D to 2D exporting program 12, corresponding to all of the scanned tools 5 required to be stored in one or more pads 1, and variables 19a such as size and weight of the tools 5, frequency of use, user specific preferences, tools 5 storing density, tools 5 family groupings, the characteristics of the cabinet 3 and drawers 4, such as size of the cabinet 3 and drawers 4, number of drawers 4 and number and size of the pads 1 to be stored per drawer 4, in order to generate a distributing file 20—which may be a text file—including information about the tools 5 that can be stored in each available pad 1.

If there are tools 5 that cannot be accommodated in any of the available pads 1, the distributing genetic algorithm 19 will provide recommendations—in the form of a recommendations file 21 which may be a text file—based on the cabinet 3 information such as producing more pads 1—if the size of the cabinet 3 and drawers 4 allow storing more pads 1, enlarging the cabinet 3 and/or the drawers 4 or leaving the less used tools outside the cabinet 3—based on selection criteria either feed by the user to the computer 11 running the distributing genetic algorithm 19, previously defined in the algorithm 19 or received from other computer solutions. The distributing 20 and recommendations 21 files produced by evaluating predefined rules and alternatives considering the above described variables.

An accommodation genetic algorithm 22 for generating the accommodation layout of each receptacle 2 corresponding to each tool 5 inside the space of each available pad 1, which receives as input the distributing file 20 generated by the distributing genetic algorithm 19 and variables 22a such as the width of each pad 1, size of each tool 5, predefined rules about the preferred orientation of each tool 5, tools family groupings user specific preferences, the characteristics of the cabinet 3 and drawers 4, such as size of the cabinet 3 and drawers 4 and critical factors such as density in the x, y and z axis—when required by 3D models—as well as silhouette rotation of each tool 5 in the plane in which the accommodation layout will be generated. The accommodation genetic algorithm 22 considers the above referred input and evaluates different accommodation layouts and selects the best accommodation layout based on said considerations, and calculates the exact position of each tool 5 in each available pad 1 in the form of coordinates in the X and Y axis—and Z axis when required by 3D models—and a rotation angle ☐ for each tool 5 in the used planes. Finally, based on said position information for each tool 5, one or more accommodation layout image files 23 in a vectorial format such as DWG—corresponding to each pad—are generated, each including the accommodation layout of each tool 5 in each pad 1.

If one or more of the input variables 22a or critical factors considered by the accommodation genetic algorithm 22 changes, and the generated accommodation layout is not satisfactory, the computer may re-run 11 the accommodation genetic algorithm for generating new results based on the modified input variables 22a and critical factors, or may notify a user and wait for an external instruction.

The invention also includes an RFID identification chip and RFID identification chip reader placement program including:
  a computer program for identifying the optimum face in each tool for placing the RFID identification chip 24, which receives as input the three pairs of 2D opposite view image files 14, each containing opposite views taken from each side of the 2D minimum container box file 13 generated by the 3D to 2D exporting program 12 and selects the 2D image file that contains the optimum tool 5 side for placing the RFID chip 8 based on the relation between the contact areas of each tool 5 and the surface occupied by said tool 5 face, excluding the working areas. The output of this program are the selected 2D image files 25—one image file per tool—containing the optimum tool side for placing the RFID chip 8;
  a RFID identification chip optimum place identification neural network 26, which receives as input the selected 2d image files 25 of each tool 5 containing the optimum tool side, the tool identification information and "working areas" file 18a for each tool 5 from the tool identification neural network 15 and "working areas" identification neural network 18 respectively, for determining the optimum place for attaching the RFID identification chip 8 based on the contact areas of the selected side of the tool 5, predetermined rules about the lecture distance of the RFID chip 8 and previously defined examples for each family and class of tools stored in the network memory 16. The output of the RFID optimum place identification neural network 26 comprises an image file per tool in which the working areas and the place where RFID chip must be placed are indicated 27. It further contains text data comprising the identification information of the tool. The place of the RFID chip can also be expressed in dimension percentages of each 2D image file starting from the centroid of said image.

A computer program defines the optimum place for attaching the RFID readers to a correspondent receptacle 28, which must be properly aligned with the tool RFID identification chips so that a proper reading process can be guaranteed, said program receiving as input the image files 23 in a vectorial format such as DWG—corresponding to each pad—, each including the accommodation layout of each receptacle in each pad 1 generated by the accommodation genetic algorithm 22 and each image file of the tools 27 generated by the RFID identification chip optimum place identification neural network 26 in which the place where RFID chip must be placed is indicated, and said program generating image files 29 in a vectorial format such as DWG—corresponding to each pad—, each indicating the place where the RFID identification chips must be placed inside each receptacle.

Optionally the computer program for defining the optimum place for attaching the RFID readers to a correspondent receptacle 28 can generate and indicate in each image file place the optimum place where the electronics 30 may be placed if needed and the optimum route for the wiring 31 of the whole pad by using optimization algorithms.

Means for molding each pad 32, comprise an automated molding machine receiving the image files 23 corresponding to each pad 1 to be molded, each file 23 containing the distribution layout of each receptacle in a correspondent pad in order to produce one or more pads 1 having a plurality of receptacles 2 for storing tools of different shapes and sizes, Although it was described that the identification of the tool images produced by the scanner is carried out by the computer, in other embodiment of the invention, the tool identification may be carried out manually. In said manual identification of tools, the user may provide to the computer any data that may identify the object such as category, family, brand or model. Furthermore, the user can define in each tool image the working areas of the tool by drawing a rectangle around said working areas. For 3d image files, the areas may be defined by polygonal shapes such as rectangular sub-boxes defined by two point in space corresponding to a pair of opposite vertices of each sub-box and referenced with respect to the centroid of the minimum container box produced by the computer. The distances to the vertices from said centroid can be expressed in percentages of the dimensions of the minimum container box. The above referred information together with a tridimensional image file of each tool can be stored in a computer database for future reference and for the use of the programs, algorithms, neural networks and genetic algorithms run by the computer, The computer may re-run the distributing genetic algorithm and accommodation genetic algorithm as needed until obtaining a distribution layout for each pad in accordance with the predefined rules and the space available in the cabinet.

Although in the preferred embodiment of the invention, the system of the present invention was used for producing a predetermined number of foam pads including a plurality of different shaped receptacles for storing a plurality of tools having different sizes, shapes and weights, it must be understood that it can be used to produce foams for storing any kind of item such as guns, medical instruments, containers, etc., and the pad may be made of any malleable material that can be molded by a molding machine so that the plurality of receptacles can be drilled in the pad.

Finally although in the preferred embodiment of the invention the system of the present invention was used for producing a predetermined number of foam pads including a plurality of different shaped receptacles for storing a plurality of tools having different sizes, shapes and weights to be stored inside the drawers of a cabinet, it must be understood that the system may produce individual pads that are no part of any container Finally it must be understood that the system for designing and producing packaging molds of the present invention, is not limited exclusively to the embodiments above described and illustrated and that the persons having ordinary skill in the art can, with the teaching provided by the invention, to make modifications to the system for designing and producing packaging molds of the present invention, which will clearly be within of the true inventive concept and of the scope of the invention which is claimed in the following claims.

What is claimed is:

1. A system for producing custom layouts for storage or transport molds, each mold having a plurality of receptacles for storing an item, wherein each receptacle conforms to a shape of a particular item to be stored in said receptacle, said system for producing custom layouts for storage or transport molds comprising:
   means for scanning and obtaining 2D and 3D electronic image files of each item to be stored in a mold;
   data processing means including:
      means for identifying the type of item depicted by each image file;
      means for generating the shape of each receptacle;
      means for distributing the generated receptacles into one or more molds;
      means for generating an accommodation layout of each receptacle in said one or more molds and one or more image files each containing the accommodation layout of each receptacle in the one or more molds.

2. A system for producing custom layouts for storage or transport molds as claimed in claim 1, further including an automated molding machine receiving the image files for automatically molding the receptacles in the one or more molds.

3. A system for producing custom layouts for storage or transport molds as claimed in claim 1, wherein the data processing means further including a "working areas" identification neural network for identifying the "working areas" of each identified item which are the areas or places where the item performs a function and/or is manipulated by a user.

4. A system for producing custom layouts for storage or transport molds as claimed in claim 3, wherein the data processing means further including means for obtaining the optimum place for attaching identification means to each item and for obtaining the optimum place for attaching a correspondent identification means reader to a correspondent receptacle in accordance with the working areas of each item that must not be considered for placing said identification chip.

5. A system for producing custom layouts for storage or transport molds, as claimed in claim 4, wherein the means for obtaining the optimum place for attaching identification means to each item and for obtaining the optimum place for attaching corresponding identification means reader to a correspondent receptacle comprising:
   a computer program for identifying an optimum face in each item for placing the identification means, which receives as input 2D opposite view image files generated by a 3D to 2D exporting program which processes the 2D and 3D electronic image files for generating said 2D opposite view image files, said program for identifying an optimum face in each item for placing the identification means selecting the 2D image file that contains the optimum item side for placing the RFID chip;
   identification means optimum place identification neural network which receives as input the selected image files of each item containing the optimum item side, item identification information and "working areas" for each item, for determining the optimum place for attaching identification means in each item, and producing an image file per item in which the working areas and the place where the identification means must be placed are indicated; and
   a computer program for defining the optimum place for attaching identification means reader to a correspondent receptacle, which must be properly aligned with the identification means of a correspondent item so that a proper reading process can be guaranteed, said program receiving as input image files each including the accommodation layout of each receptacle in a correspondent mold generated by the means for generating the accommodation layout of each receptacle in said one or more molds and each image file generated by the identification means optimum place identification neural network in which the place where identification means must be placed is indicated, in order to generate image files indicating the place where the identification means reader must be placed inside each receptacle.

6. A system for producing custom layouts for storage or transport molds as claimed in claim 1, wherein the means for identifying the type of item depicted by each image file comprising an item identification neural network for processing each image file, identifying the item depicted by each image file and producing a file including the identification information of each item.

7. A system for producing custom layouts for storage or transport molds as claimed in claim 1, wherein the means for generating the shape of each receptacle comprises a 3D to 2D exporting program for processing each 2d and 3d file and producing a file including only a delimited image of the item, called a minimum container box file, and 2D opposite view image files each containing opposite views taken from each side of the minimum container box file.

8. A system for producing custom layouts for storage or transport molds as claimed in claim 1, wherein the means for distributing items in one or more molds comprising a distributing genetic algorithm for distributing items between one or more molds, which receives as input: the image files corresponding to the items in order to generate a distributing file including information about the items to be stored in the one or more molds.

9. A system for producing custom layouts for storage or transport molds, as claimed in claim 1, wherein each mold is to be stored in a correspondent drawer of a cabinet, wherein the means for distributing items in one or more molds comprising a distributing genetic algorithm for distributing items between one or more molds, which receives as input: the image files corresponding to the items in order to generate a distributing file including information about the items to be stored in the one or more molds, and further providing a recommendations file based on cabinet information such as size, said recommendations file including recommendations such as using more molds, enlarging the cabinet, enlarging the drawers or leaving less used items outside the cabinet.

10. A system for producing custom layouts for storage or transport molds, as claimed in claim 1, wherein the means for generating an accommodation layout of each receptacle in said one or more molds comprising an accommodation genetic algorithm for generating the accommodation layout of each receptacle inside the available space of each mold, which receives as input a distributing file including information about the items to be stored in the one or more molds generated by the means for distributing items in one or more molds and generates one or more accommodation layout image files each including the accommodation layout of each item in each pad.

11. A method for producing custom layouts for storage or transport molds, each mold having a plurality of receptacles for storing an item, wherein each receptacle conforms to a shape of a particular item to be stored in said receptacle, said system for producing custom layouts for storage or transport molds comprising:

obtaining 2D and 3D electronic image files of each item to be stored in a mold;

automatically identifying the type of item depicted by each image file;

automatically generating the shape of each receptacle;

automatically distributing the generated items into one or more molds; and automatically generating an accommodation layout of each receptacle in said one or more molds.

12. A method for producing custom layouts for storage or transport molds as claimed in claim 11, further including providing an automated molding machine receiving the image files for automatically molding the receptacles in the one or more molds.

13. A method for producing custom layouts for storage or transport molds as claimed in claim 11, further including automatically identifying the "working areas" of each identified item which are the areas or places where the item performs a function and/or is manipulated by a user.

14. A method for producing custom layouts for storage or transport molds as claimed in claim 13, further including automatically obtaining the optimum place for attaching identification means to each item and automatically obtaining the optimum place for attaching a corresponding identification means reader to a correspondent receptacle in accordance with the working areas of each item that must not be considered for placing said identification chip.

15. A method for producing custom layouts for storage or transport molds, as claimed in claim 14, wherein the step of automatically obtaining the optimum place for attaching identification means to each item and automatically obtaining the optimum place for attaching corresponding identification means reader to a correspondent receptacle are performed by:

a computer program for identifying an optimum face in each item for placing the identification means, which receives as input 2D opposite view image files generated by a 3D to 2D exporting program which processes the 2D and 3D electronic image files for generating said 2D opposite view image files, said program for identifying an optimum face in each item for placing the identification means selecting the 2D image file that contains the optimum item side for placing the RFID chip;

identification means optimum place identification neural network which receives as input the selected image files of each item containing the optimum item side, item identification information and "working areas" for each item, for determining the optimum place for attaching identification means in each item, and producing an image file per item in which the working areas and the place where the identification means must be placed are indicated; and a computer program for defining the optimum place for attaching identification means reader to a correspondent receptacle, which must be properly aligned with the identification means of a correspondent item so that a proper reading process can be guaranteed, said program receiving as input image files each including the accommodation layout of each receptacle in a correspondent mold generated by the step of automatically generating the accommodation layout of each receptacle in said one or more molds and each image file generated by the identification means optimum place identification neural network in which the place where identification means must be placed is indicated, in order to generate image files indicating the place where the identification means reader must be placed inside each receptacle.

16. A method for producing custom layouts for storage or transport molds as claimed in claim 11, wherein the step of automatically identifying the type of item depicted by each image file is performed by an item identification neural network for processing each image file, identifying the item depicted by each image file and producing a file including the identification information of each item.

17. A method for producing custom layouts for storage or transport molds as claimed in claim 11, wherein the step of generating the shape of each receptacle is performed by a 3D to 2D exporting program for processing each 2d and 3d file and producing a file including only a delimited image of the item, called a minimum container box file, and 2D opposite view image files each containing opposite views taken from each side of the minimum container box file.

18. A method for producing custom layouts for storage or transport molds as claimed in claim 11, wherein the step of automatically distributing items in one or more molds is carried out by a distributing genetic algorithm for distributing items between one or more molds, which receives as input: the image files corresponding to the items in order to generate a distributing file including information about the items to be stored in the one or more molds.

19. A method for producing custom layouts for storage or transport molds, as claimed in claim 11, wherein each mold is to be stored in a correspondent drawer of a cabinet, wherein the step of automatically distributing items in one or more molds further include automatically providing recommendations based on cabinet information such as size, said recommendations file including recommendations such as using more molds, enlarging the cabinet, enlarging the drawers or leaving less used items outside the cabinet which is performed by a distributing genetic algorithm for distributing items between one or more molds, which receives as input: the image files corresponding to the items in order to generate a distributing file including information about the items to be stored in the one or more molds, and a file including said recommendations.

20. A method for producing custom layouts for storage or transport molds, as claimed in claim 11, wherein the step of automatically generating an accommodation layout of each receptacle in said one or more molds is performed by an accommodation genetic algorithm for generating the accommodation layout of each receptacle inside the available space of each mold, which receives as input a distributing file including information about the items to be stored in the one or more molds generated by the step of automatically distributing items in one or more molds and generates one or more accommodation layout image files each including the accommodation layout of each item in each pad.

* * * * *